US011086919B2

(12) United States Patent
Parthasarathy et al.

(10) Patent No.: US 11,086,919 B2
(45) Date of Patent: Aug. 10, 2021

(54) SERVICE REGRESSION DETECTION USING REAL-TIME ANOMALY DETECTION OF LOG DATA

(71) Applicant: Harness Inc., San Francisco, CA (US)

(72) Inventors: Sriram Parthasarathy, Fremont, CA (US); Raghvendra Singh, Fremont, CA (US); Parnian Zargham, Santa Clara, CA (US); Rishikesh Singh, Sunnyvale, CA (US); Jyoti Bansal, San Francisco, CA (US)

(73) Assignee: Harness Inc., San Francisco, CA (US)

( * ) Notice: Subject to any disclaimer, the term of this patent is extended or adjusted under 35 U.S.C. 154(b) by 0 days.

(21) Appl. No.: 15/997,512

(22) Filed: Jun. 4, 2018

(65) Prior Publication Data
US 2019/0258725 A1 Aug. 22, 2019

Related U.S. Application Data

(63) Continuation-in-part of application No. 15/899,232, filed on Feb. 19, 2018, now Pat. No. 10,445,217.

(51) Int. Cl.
G06F 7/00 (2006.01)
G06F 16/35 (2019.01)
G06N 3/08 (2006.01)
G06F 11/30 (2006.01)
G06K 9/62 (2006.01)
G06F 16/33 (2019.01)
G06F 40/284 (2020.01)

(52) U.S. Cl.
CPC ........ *G06F 16/355* (2019.01); *G06F 11/3065* (2013.01); *G06F 16/3347* (2019.01); *G06F 40/284* (2020.01); *G06K 9/6215* (2013.01); *G06N 3/08* (2013.01)

(58) Field of Classification Search
CPC .......................... G06F 11/3644; G06F 16/355
USPC ........................................... 717/130; 707/737
See application file for complete search history.

(56) References Cited

U.S. PATENT DOCUMENTS

| 5,335,342 | A  | * | 8/1994  | Pope ................... G06F 11/3672 714/38.13 |
| 8,060,221 | B2 | * | 11/2011 | Sakagami ............ G05B 19/058 700/23 |
| 8,561,020 | B2 | * | 10/2013 | Hammer .................. G06F 8/71 717/111 |
| 9,058,543 | B2 | * | 6/2015  | Campbell ............ G06K 9/6878 |
| 9,092,802 | B1 | * | 7/2015  | Akella ................... G06N 7/005 |
| 9,607,652 | B2 | * | 3/2017  | Bose .................. H04N 5/23229 |

(Continued)

*Primary Examiner* — Evral E Bodden
(74) *Attorney, Agent, or Firm* — Bachmann Law Group PC

(57) ABSTRACT

The present system provides continuous delivery and service regression detection in real time based on log data. The log data is clustered based on textual and contextual similarity and can serve as an indicator for the behavior of a service or application. The clusters can be augmented with the frequency distribution of its occurrences bucketed at a temporal level. Collectively, the textual and contextual similarity clusters serve as a strong signature (e.g., learned representation) of the current service date and a strong indicator for predicting future behavior. Machine learning techniques are used to generate a signature from log data to represent the current state and predict the future behavior of the service at any instant in time.

12 Claims, 9 Drawing Sheets

(56) References Cited

U.S. PATENT DOCUMENTS

| | | | | |
|---|---|---|---|---|
| 2003/0229825 A1* | 12/2003 | Barry | ............. | G06F 11/3672 |
| | | | | 714/38.14 |
| 2007/0198445 A1* | 8/2007 | Zen | ............. | G06N 7/005 |
| | | | | 706/15 |
| 2017/0177458 A1* | 6/2017 | Viggers | ............. | G06F 11/2236 |
| 2019/0018758 A1* | 1/2019 | Stern | ............. | G06F 11/3652 |

* cited by examiner

SERVICE REGRESSION DETECTION USING REAL-TIME ANOMALY DETECTION OF LOG DATA

CROSS REFERENCE TO RELATED APPLICATIONS

The present application is a continuation-in-part of U.S. patent application Ser. No. 15/899,232, filed on Feb. 19, 2018, titled "SERVICE REGRESISION DETECTION USING REAL-TIME ANOMALY DETECTION OF APPLICATION PERFORMANCE METRICS," the disclosure of which is incorporated herein by reference.

BACKGROUND

Software systems that provides Web services, computing device operating systems, cellular phone and mobile device operating systems, and other software typically are updated throughout their lifetime. The delivery of changes to software by developers is a contentious task. Though software is tested before it is delivered to a live platform that serves users, unforeseen errors and bugs often arise that need to be dealt with by software engineers. The process of pushing updates out to software, detecting bugs and errors, and retracting or further revising the software is typically done by human programmers, and is inefficient and time-consuming. What is needed is an improved method for delivering changes to software systems.

SUMMARY

The present technology, roughly described, provides continuous delivery and service regression detection in real time based on log data, which can include log messages, headers, and other data associated with a log. The log data is clustered based on textual and contextual similarity and can serve as an indicator for the behavior of a service or application. The clusters can be augmented with the frequency distribution of its occurrences bucketed at a temporal level, such as by one or more minutes, hours, or some other period of time. Collectively, the textual and contextual similarity clusters serve as a strong signature (e.g., learned representation) of the current service data and a strong indicator for predicting future behavior. Machine learning techniques are used to generate a signature from log data to represent the current state and predict the future behavior of the service at any instant in time. The learned representation or signature can then be used to predict service regressions either in functionality or performance starting at deployment time and extending beyond. The present technology utilizes large amounts of data to detect failures very quickly using a novel incremental and real-time streaming-based anomaly detection technique.

In embodiments, a method is disclosed for automatic continuous deployment of code changes. The method includes receiving, by a manager application on a server, log data from a delegate on a remote machine. The delegate can collect log data from a node within an application that is currently executing. The log data including a first log data associated with a change in code within the node and a second log data. A first learned representation is generated for the received first log data and a second learned representation is generated for the received second log data by the manager application. The first learned representation is compared to the second learned representation to identify unexpected events or unexpected frequencies. A determination is made as to whether the change in code is acceptable based on the comparison.

DETAILED DESCRIPTION

The present system provides continuous delivery and service regression detection in real time based on log data. The log data are clustered based on textual and contextual similarity and can serve as an indicator for the behavior of a service or application. The clusters can be augmented with the frequency distribution of its occurrences bucketed at a temporal level, such as by one or more minutes, hours, or some other period of time. Collectively, the textual and contextual similarity clusters serve as a strong signature (e.g., learned representation) of the current service data and a strong indicator for predicting future behavior. Machine learning techniques are used to generate a signature from log data to represent the current state and predict the future behavior of the service at any instant in time. The learned representation or signature can then be used to predict service regressions either in functionality or performance starting at deployment time and extending beyond. The present technology utilizes large amounts of data to detects failures very quickly using a novel incremental and real-time streaming-based anomaly detection technique.

Log data as used herein can include log messages, headers, and other data associated with a log. References to log data and log messages is intended to collectively refer to log messages, log headers, and other data associated with a log for a node, application, or machine or other log.

Figure 1:
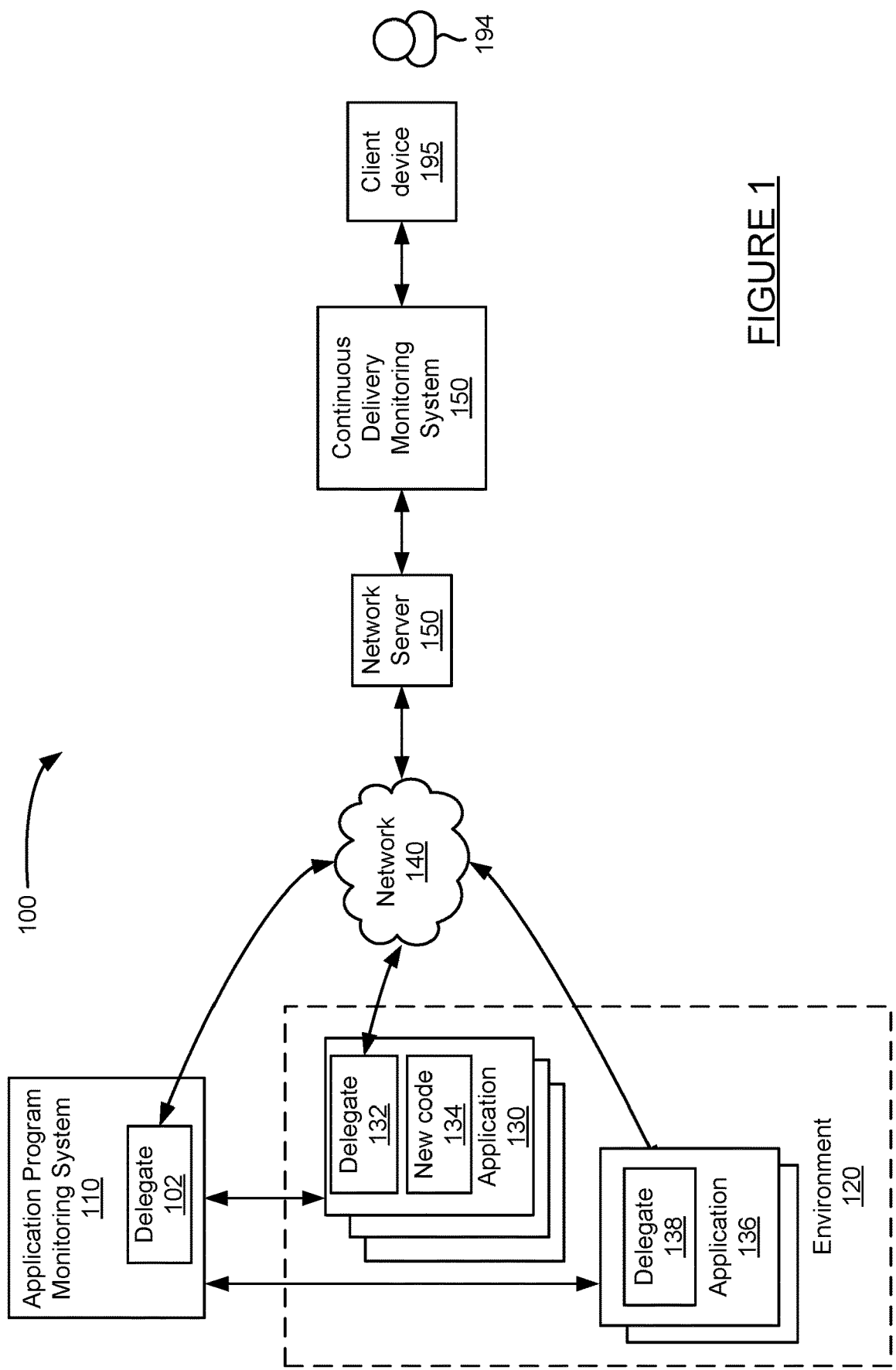
FIG. 1 is a block diagram of a system for providing continuous delivery and service regression detection in real-time for log messages.

FIG. 1 is a block diagram of a system for providing continuous delivery and service regression detection in real-time for log messages. The block diagram of FIG. 1 includes application program monitoring system 110, environment 120 having application 130 and application 136, network 140, network server 150, continuous delivery monitoring system 150, and client device 195.

Environment 120 may include one or more machines or servers, including mobile devices, client devices with applications and network browsers, servers, and other machines (not illustrated in FIG. 1) upon which applications 130 and 136 may be executing. The changes to software may be applied to the one or more applications on servers within environment 120. For example, within application 130, new code 134 may be installed onto application 130.

Network 140 may include one or more private networks, public networks, intranets, the Internet, wide-area networks, local area networks, cellular networks, radiofrequency networks, Wi-Fi networks, and any other network which may be used to transmit data.

Continuous delivery monitoring system 150 may detect service regression in the performance or behavior of one or more applications within environment 120 in real-time after a software update 134 is delivered to application 130. To detect service regression, monitoring system 150 may monitor the applications either directly through delegates installed on the applications themselves, such as delegates 132 and 138, or by access to real-time streaming monitoring data (including log messages or other data) provided by application program monitoring system 110, for example via delegate 102.

A delegate may include an agent or other code that is installed to an application or system (e.g., host) and can communicate with remote systems and applications such as continuous delivery monitoring system 150. Each delegate may receive instructions and tasks from monitoring system 150, retrieve information and transmit the information periodically or based on other events to monitoring system 150, may install new code or update code on an application or system, and perform other tasks and operations. In some instances, delegate 102 may be installed on an application program monitoring system, such as a monitoring system provided by AppDynamics, Inc., of San Francisco Calif., to retrieve and transmit a stream of log messages to delivery monitoring system 150. In some instances, delegates may be provided on one or more servers of an environment 120, such as servers hosting application 130 and application 136, to monitor applications and servers that include new code 134 and those that did not host any new code (e.g., control servers).

Network server 150 may receive requests and other transmissions on behalf of monitoring system 150 received over network 140. In some instances, network server 150 may process the request or transmission sore for them to monitoring system 150 for handling. Network server 150 may be implemented on monitoring system 150 or implemented separately, either logically or physically, from system 150.

Continuous delivery monitoring system 150 may provide continuous monitoring of a system receiving an upgrade or change in code, determine if there are any immediate or near-term issues, such as performance regression, may provide reports, alerts, and may perform failure strategy operations such software version rollback. The continuous delivery monitoring system 150 may include a manager that manages tasks associated with the monitoring, utilization modules, clustering modules, a data store and other functionality. More details for a continuous delivery monitoring system are discussed with respect to FIG. 2.

As monitoring system 150 provides continuous delivery and monitoring of new code, it may provide updates through a user interface to a user 194. The updates may be provided through a user interface provided within a network browser, such as a web browser, an output from one or more mobile applications, or some other output of a client device 195. Client device 195 may be implemented as any computer that can receive and provide reports, such as a user interface or dashboard, via a network browser on a mobile device, smart phone, tablet, or any other computing machine.

Figure 2:
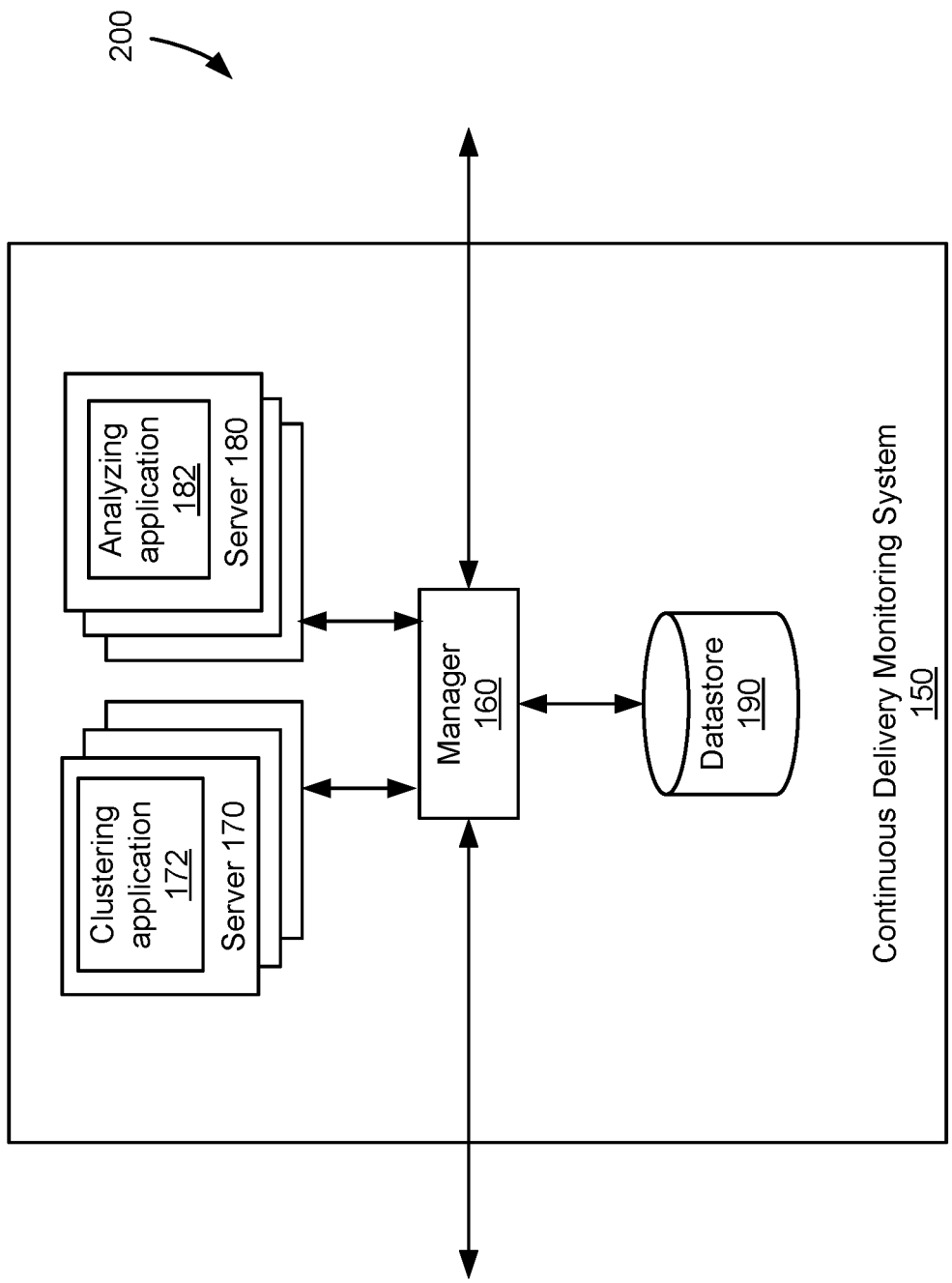
FIG. 2 is a block diagram of a continuous delivery monitoring system.

FIG. 2 is a block diagram of a continuous delivery monitoring system. The block diagram of FIG. 2 provides more detail of continuous delivery monitoring system 150 illustrated in FIG. 1. Continuous delivery monitoring system 150 includes manager 160, servers 170 and 180, and data store 190. Manager 160 may communicate with delegates 102, 132, and 138, provide them with tasks, instructions, and updates. For example, manager 160 can receive data from a delegate such as a type and timestamp information for log messages and other data, initiate data analyzing and clustering, process data at data store 190, and report information to client device 195 for user.

Server 170 may include clustering application 172. In some instances, manager 160 may provide learned representations of log data to clustering application 172 for clustering. The data may be clustered as described herein.

Server 180 includes analyzing application 182. Analyzing application 182 may analyze clustered and raw data provided by manager 160 and/or 172 to identify anomalies, service regressions, predict future behavior, and other analysis.

Data store 190 may communicate with manager 160 and may be used to persist streaming log message data received by manager 160.

The present technology can perform service regression detection at deployment and beyond using real-time log anomaly detection using machine learning techniques. The machine learning techniques may include using natural language processing to convert log text into a token of words. Vectorization techniques can then be used represent the token of words as a vector of scalars the can be used in various machine learning algorithms. Neural networks can then be used to create a learned representation for the word tokens. This is similar to generating a scaler from the token words generated from the log text, but captures contextual similarity among the word tokens. An unsupervised clustering or neural networks can be used to form log message clusters. Then, statistical techniques can be used to form the frequency distributions of cluster occurrences. The combined clusters and frequency distributions are then used to generate a signature. An ensemble machine learning approach can then be used to compare the signatures using neural networks, distance measures and statistical techniques. More details for providing continuous delivery monitoring using machine learning techniques is discussed with respect to FIGS. 3-8.

Figure 3:
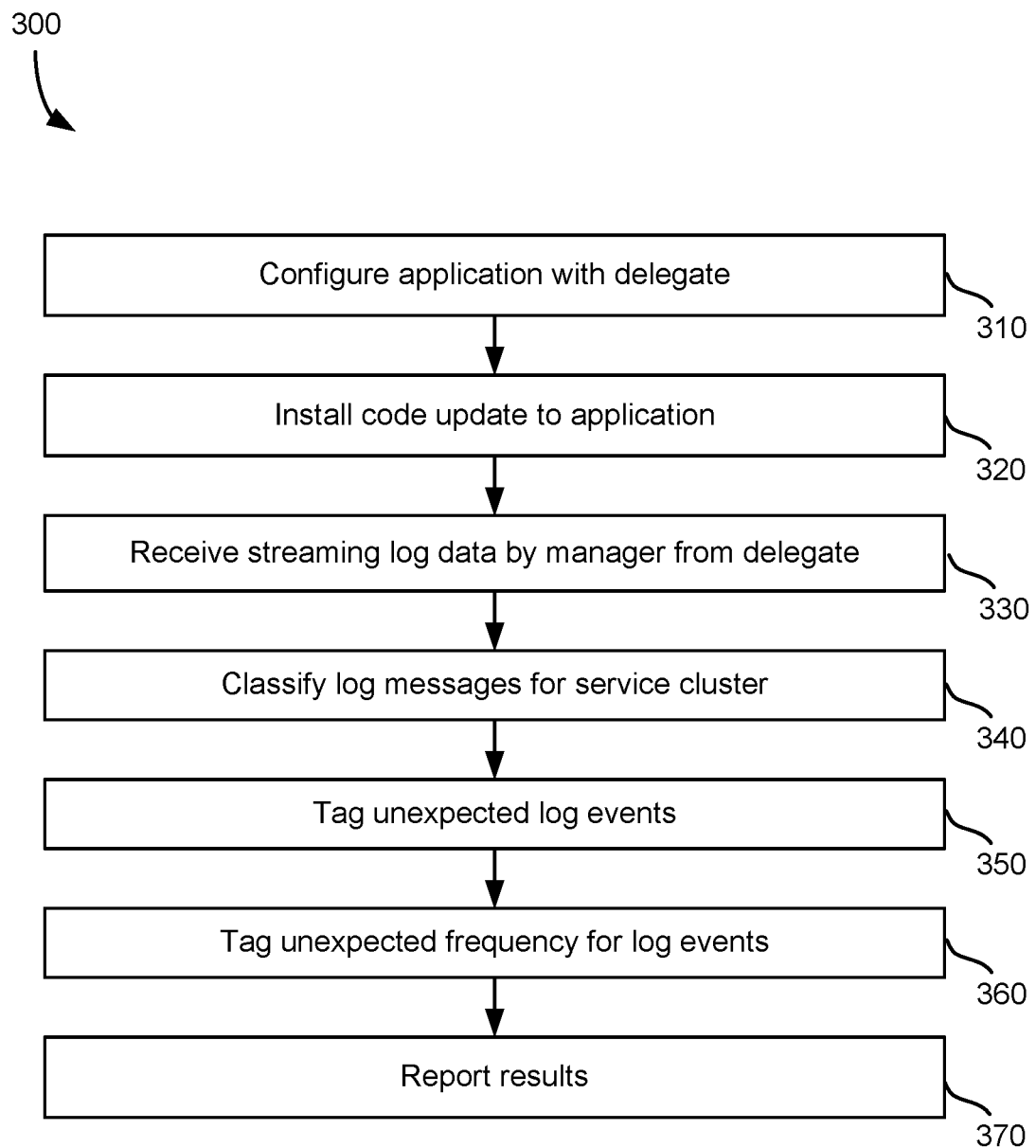
FIG. 3 is a method for providing continuous delivery monitoring.

FIG. 3 is a method for providing continuous delivery monitoring. An application may be configured with a delegate at step 310. Configuring an application with a delegate may include installing the delegate to the particular application (e.g., host). The configuration may also include configuring the delegate with which data to capture, which managers (e.g., servers and applications) to communicate with, and other configuration tasks.

Code may be installed within an environment 120 to update one or more applications within the environment at step 315. In some instances, the software update may be installed in a portion of applications or nodes to analyze whether the updated applications, or nodes, that include the software update behave differently than the applications/nodes without the update. For example, for a given number of nodes that a software update might apply to, only 5% of the nodes may initially be updated with the software update to determine if the nodes operate as expected with the update. The remainder of the nodes/applications may be updated in phases or in some other fashion.

Once the code updates are provided to the application configured with the delegate, log message data may be received by a manager from the delegate at step 320. Receiving the log message data may include initial communications between a manager and the delegate, followed by transmission of the data from the delegate to the manager. More detail for receiving log message data by a manager from a delegate is discussed with respect to the method of FIG. 4.

Log messages are classified for a service cluster at step 340. Classifying log messages for a service cluster may include observing streaming log data and clustering the log data into sets of messages which are similar in text and context. The observation and clustering may be performed for both one or more control nodes and test nodes. With respect to a control node, the clustering may be performed based on previous data collected from a control node or group of nodes running a previous version of software without the updated code, or current data collected from currently executing control nodes that have a version of software without the updated code. In either case, data collected from the control nodes will not include the updated code and may serve as a baseline for expected behavior from nodes that are running the updated or new code. More details for step 340 are discussed with respect to the method of FIG. 5.

Unexpected log events may be tagged at step 350. Tagging unexpected log events may include identifying events that represent anticipated events as well as determining which log data events represent are not anticipated. Unanticipated events may include events which are a threshold distance away from control events in scaler vector form. More detail for tagging unexpected events is discussed with respect to the method of FIG. 7.

Log event unexpected frequencies are tagged at step 360. Even though a log event may be an anticipated event, the frequency of the particular event in new or updated code may differ in an undesirable way from that associated with the control node. As such, the unexpected frequency of the log events can be tagged for the attention of administrator. Tagging the unexpected frequency of log events is discussed in more detail below with respect to the method of FIG. 8.

Results may be reported for the continues delivery monitoring at step 370. Reporting results may include generating alert messages, graphical data for display through an interface, identifying and reporting of patterns and distributions, implementing a failed strategy operation, and other reporting techniques.

In some instances, a failed strategy operation based on tagged event tolerance may be executed based on administrator or preset settings. For example, a node level anomaly may be aggregated to the application level for a particular system. The application as a whole may then be determined to pass or fail based on a particular tolerance. In some instances, an administrator may define a tolerance as failing on very critical, critical, or all events whether or not they are critical. The fail strategy may include performing an automatic rollback to a previous version, positing deployment of the updated code on the test nodes, sending failure notifications, and other actions.

Figure 4:
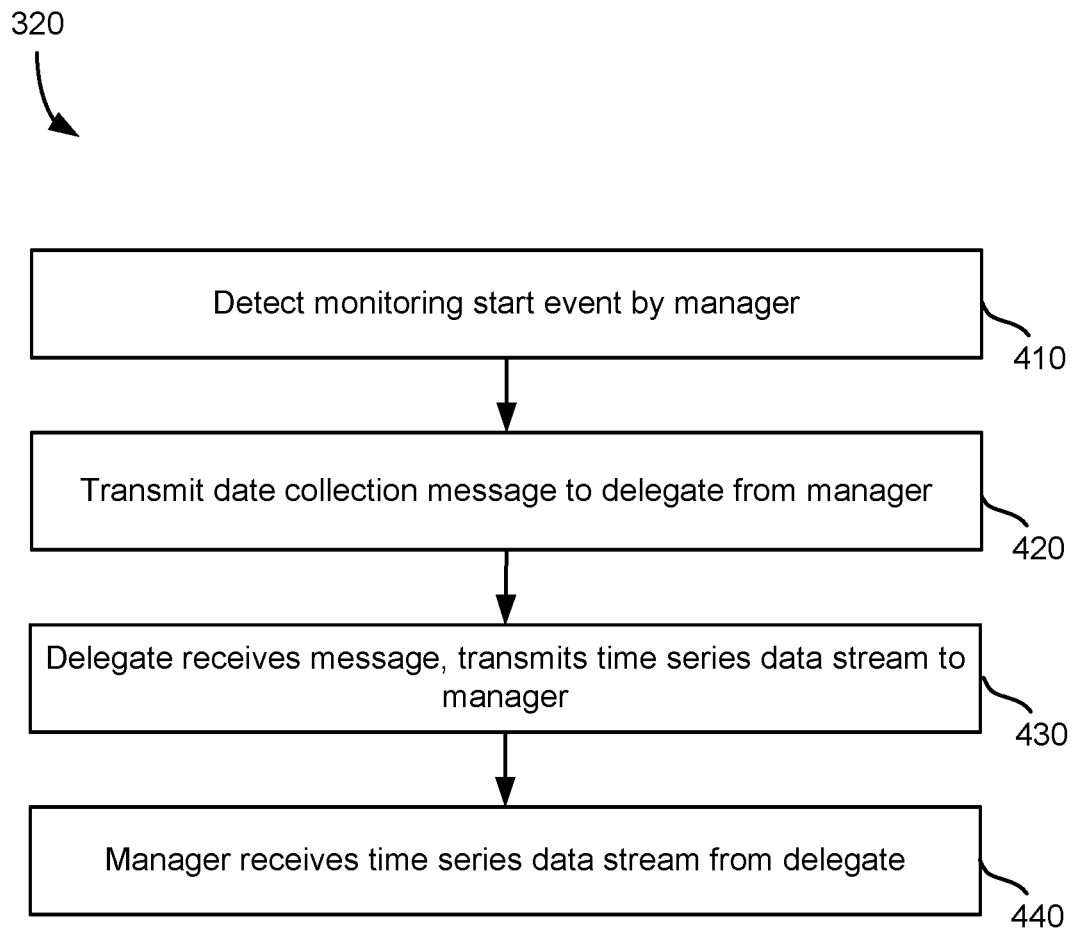
FIG. 4 is a method for installing code updates to applications.

FIG. 4 is a method for installing code updates to applications. The method of FIG. 4 provides more detail for step 320 of the method of FIG. 3. A monitoring start event is detected by a manager at step 410. The monitoring start event may be initiated by an administrator that wishes to monitor code deployment through the user interface or dashboard, initiated in response to a scheduled code update, or in response to some other event. Once monitoring is initiated at step 410, a data collection message is transmitted to one or more delegates from the manager at step 420. The data collection message may indicate which delegates should retrieve and transmit data, when data collection should start, the frequency of data reporting, and other reporting parameters. In some instances, the data collection message may be sent in the format of a task to be performed by the delegate.

Upon receiving the data collection message, the delegate transmits a log message data stream to the manager, per the received parameters, at step 430. The log message data may include log messages or other data associated with a log for a node, application, server, or machine. The log message data may be sent as a continuous data stream in real-time as it is collected by the delegate, and may be sent periodically, asynchronously, and for a certain period of time as requested by the manager in the data collection message. The manager 160 receives the log message data stream from the delegate and persists the data at data store 190.

Figure 5:
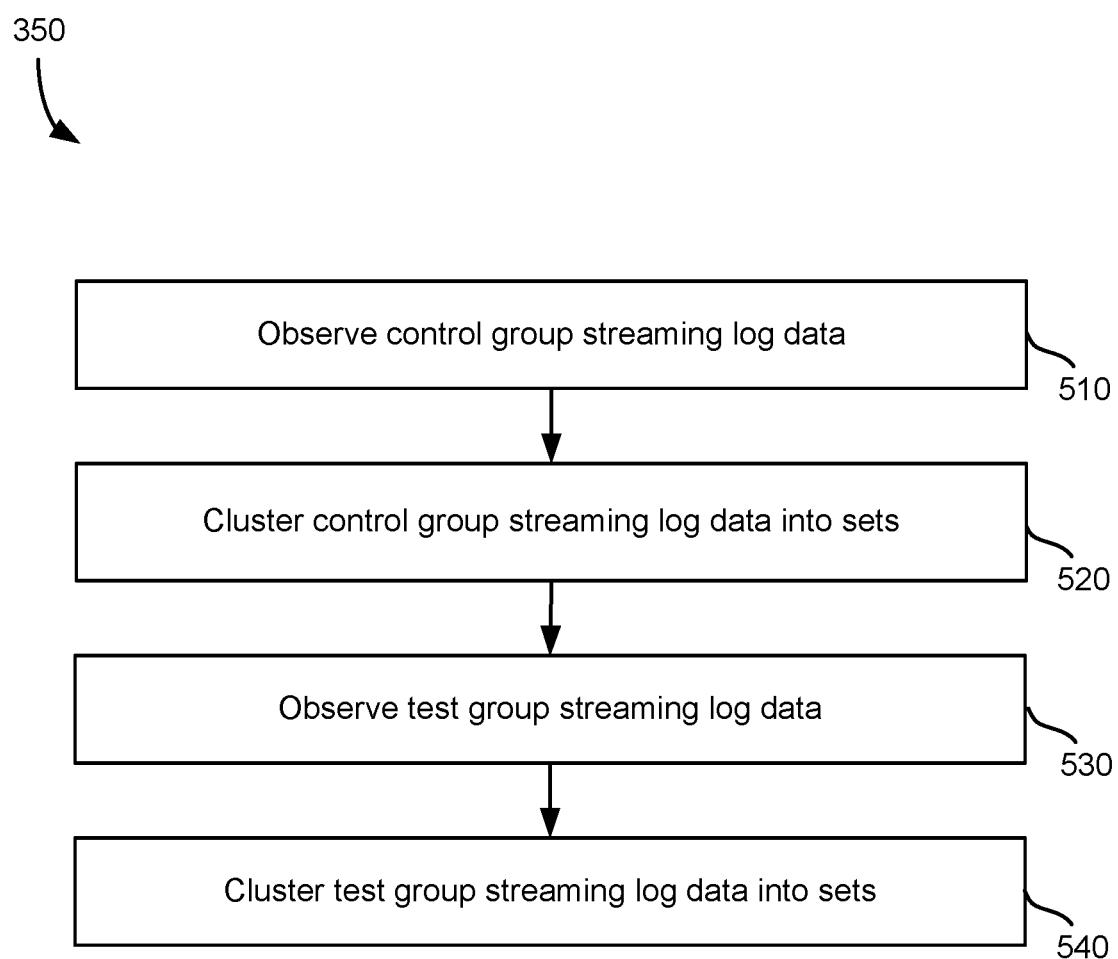
FIG. 5 is a method for classifying log messages for a service cluster.

FIG. 5 is a method for classifying log messages for a service cluster. The method of FIG. 5 provides more detail for step 340 the method of FIG. 4. First, control group streaming log data is observed at step 510. Observing the control group streaming log data may include accessing previously received control group log data or monitoring one or more control nodes while concurrently monitoring one or more test nodes. In some instances, log data for which the clusters are generated can be associated with a user-defined query, such as a user query for "errors." A cluster is generated from the control group streaming log data at step 520. Streaming log data can be clustered into sets of messages similar in text and context. More detail for clustering streaming log data is discussed with respect to the method of FIG. 6.

Test group streaming log data is observed at step 530. Observing the test group streaming log data may include receiving the test group data from one or more remote applications having a delegate that reports the data. Clusters are then generated for the test group streaming log data at step 540. Generating clusters from the test group streaming log data may be performed in the same manner as generating clusters generated for the control group, as described in more detail in the method of FIG. 6.

Figure 6:
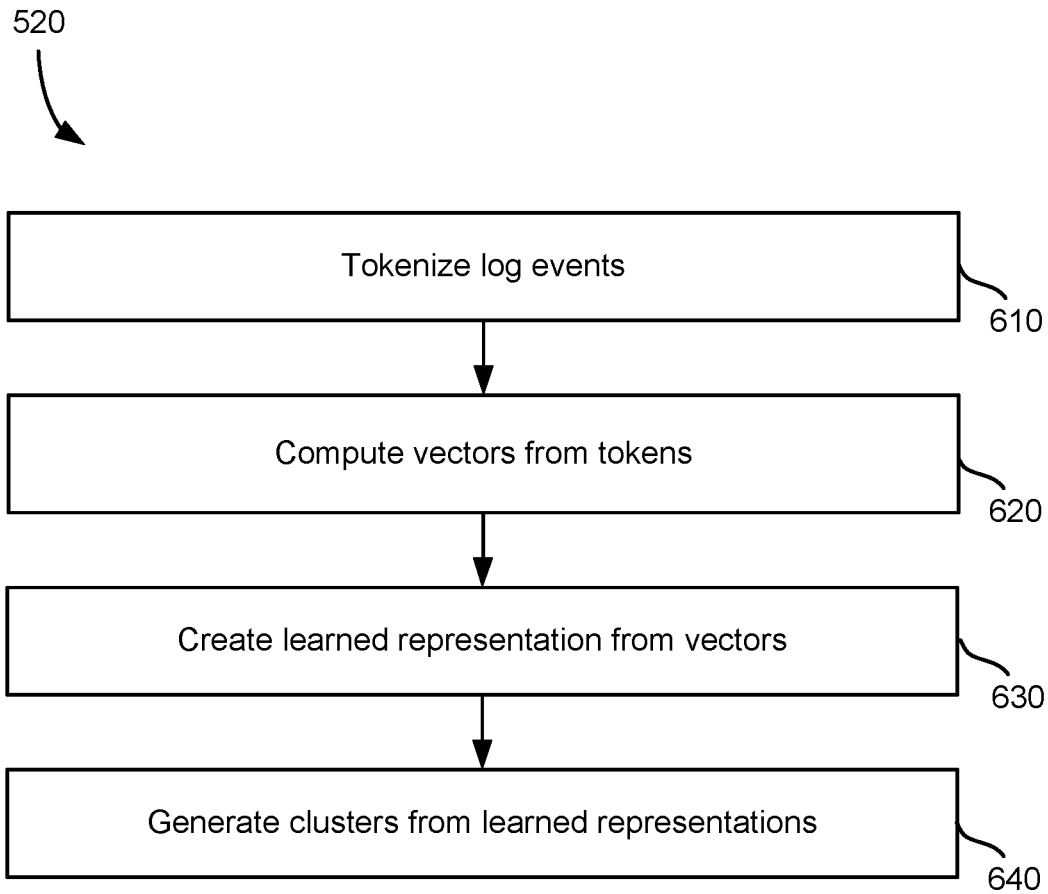
FIG. 6 is a method for generating clusters from control group streaming log data.

FIG. 6 is a method for generating clusters from control group streaming log data. The method of FIG. 6 provides more detail for step 520 of the method of FIG. 5. The process of clustering includes tokenizing log event data at step 610. In some instances, natural language processing may be used to convert a snippet of log text into a token of words. Vectors may then be generated from the generated tokens at step 620. Vector techniques are used to represent the token of words as a vector of scalars for use in machine language algorithms. In some instances, term frequency-inverse document frequency (TF-IDF) vectors may be computed from the tokens to generate the scaler vectors.

A learned representation is then created from the vectors at step 630. In some instances, neural networks may be used to create a learned representation from the vectors. The neural networks may capture contextual similarity among word tokens.

Clusters are then generated from the learned representations at step 640. Generating clusters may include running a K-means clustering algorithm and then performing a binary search for K to form log message clusters. The K-means clustering can partition observations into a number of clusters K in which each observation belongs to the cluster with the nearest mean and serves as a prototype of the cluster. The K-means algorithm is run until there all homogeneous clusters have a homogeneity score that is greater than one. A binary search for K is then performed in 1 through N, the number of events. The search is performed to determine the least value K wherein all clusters have homogeneous scores greater than a homogeneity threshold. This results in the desired clusters for the streaming log data.

Figure 7:
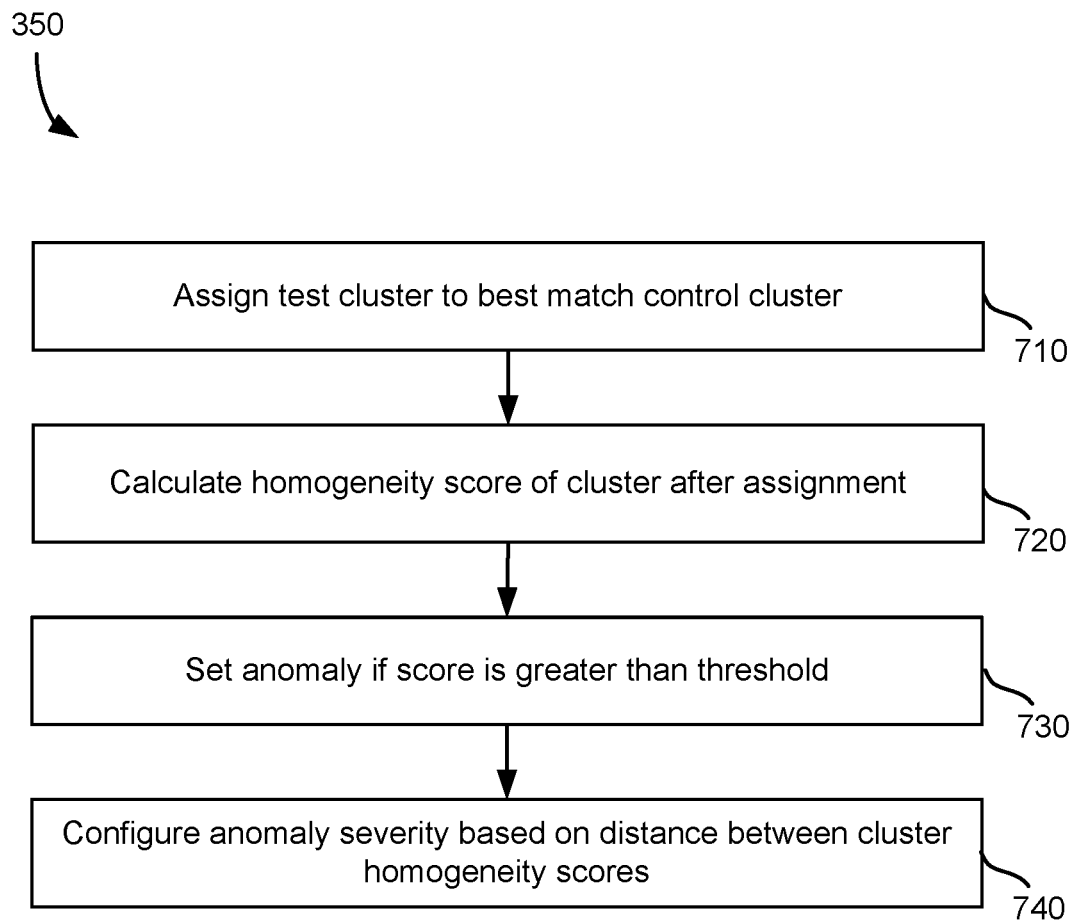
FIG. 7 is a method for tagging unexpected log events.

FIG. 7 is a method for tagging unexpected log events. The method of FIG. 7 provides more detail step 350 the method of FIG. 3. First, a test cluster is assigned to the best matching control cluster at step 710. In some instances, a best match may be determined by mapping the sample message and message count between the control cluster and the test clusters. The degree of difference between the sample messages can, in some instances, be determined as the shortest distance between vectors representing each of the test cluster and control cluster.

The homogeneity score is calculated for the cluster after assignment at step 720. An anomaly is set if the generated homogeneity score is greater than a threshold at step 730. The threshold may be set as a number of standard deviations away from the mean or some other threshold amount, either preset by the system or set by an administrator.

An anomaly severity is configured based on the distance between the cluster homogeneity scores at step 740. Severity of the anomaly may be marked as a difference between a homogeneity score of the nearest test cluster after assignment of the test cluster. In some instances, the severity may be based on the distance between cluster scalars, when severity is based on how far apart the clusters are.

Figure 8:
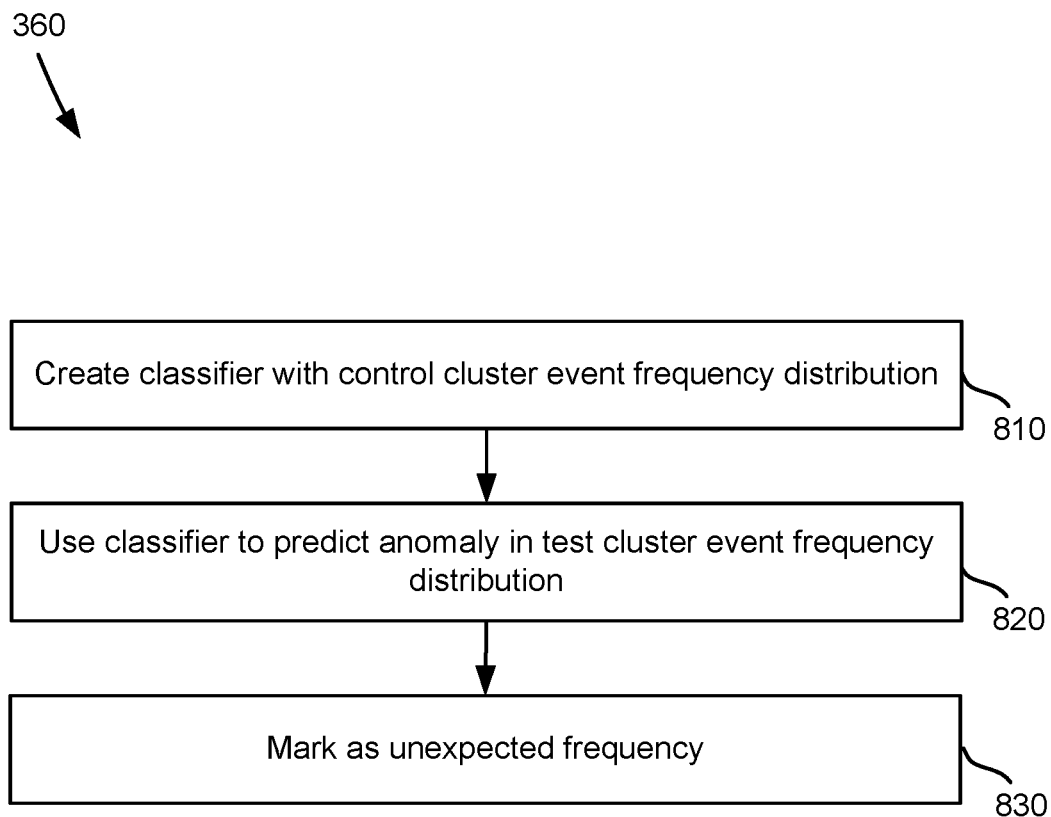
FIG. 8 is a method for tagging unexpected frequencies for log events.

FIG. 8 is a method for tagging unexpected frequencies for log events. The method of FIG. 8 provides more detail for step 360 of the method of FIG. 3. Determining whether log data represents an unexpected frequency for a particular log event begins with creating a classifier with a control cluster event frequency distribution at step 810. Statistical techniques may be used to form the frequency distributions of cluster occurrences from the cluster data. The classifier may then be used to predict an anomaly in test cluster event frequency distributions at step 820. An anomaly may be identified as any deviation that is significantly different from expected frequencies of a particular log event. Predicted anomalies are then marked as an unexpected frequency at step 830

Figure 9:
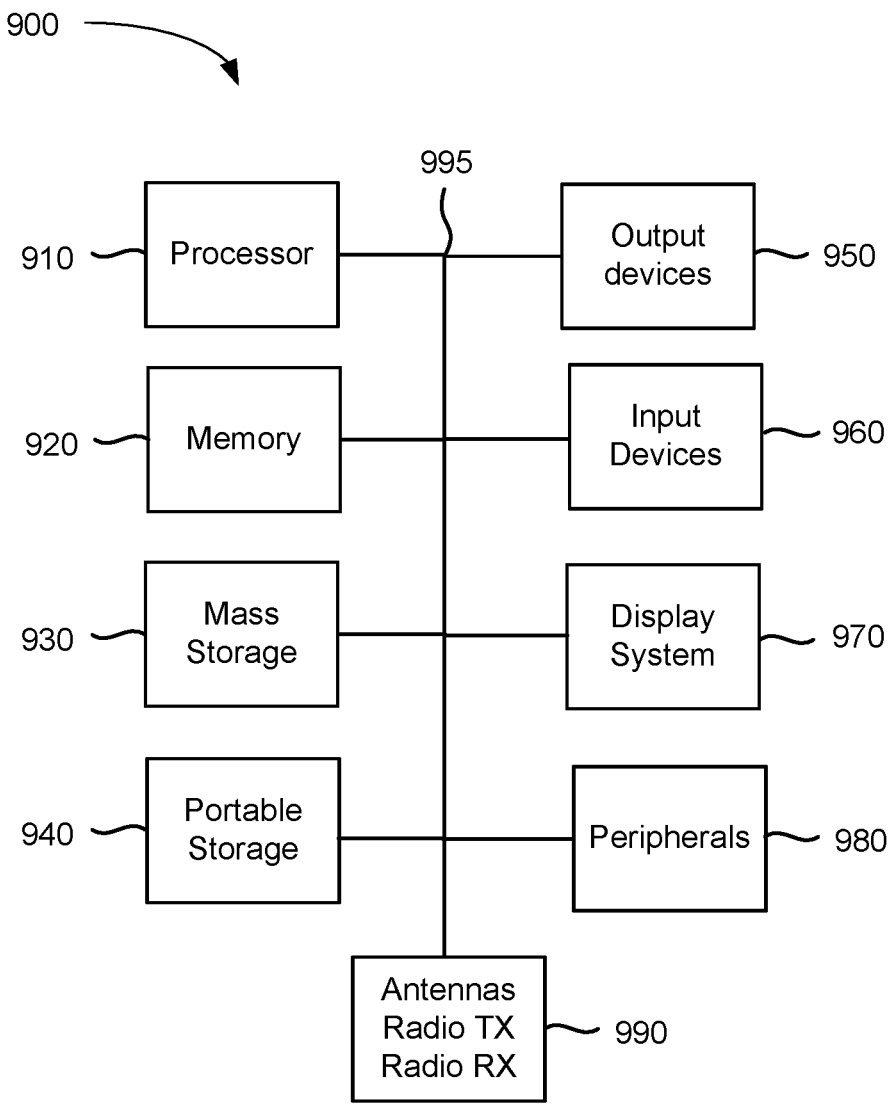
FIG. 9 is a block diagram of a system for implementing machines that implement the present technology.

FIG. 9 is a block diagram of a system for implementing machines that implement the present technology. System 900 of FIG. 9 may be implemented in the contexts of the likes of machines that implement application program monitoring system 110, machines that host applications 130 and 136, network server 150, manager 160, servers 170 and 180, datastore 190, and client device 195. The computing system 900 of FIG. 9 includes one or more processors 910 and memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive, an optical disk drive, a flash drive, or other device, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or Digital video disc, USB drive, memory card or stick, or other portable or removable memory, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information and processes the information for output to the display device. Display system 970 may also receive input as a touch-screen.

Peripherals 980 may include any type of computer support device to add additional functionality to the computer system. For example, peripheral device(s) 980 may include a modem or a router, printer, and other device.

The system of 900 may also include, in some implementations, antennas, radio transmitters and radio receivers 990. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A method for automatically continuously deploying code changes, comprising:
receiving, by a manager application on a server, log data from a delegate on a remote machine, the delegate collecting log data from a node within an application that is currently executing, the log data including a first log data associated with a change in code within the node and a second log data;
generating a first learned representation for the received first log data and a second learned representation for the received second log data by the manager application, wherein each of the first learned representation and the second learned representation includes a textual learned representation and a contextual learned representation, the contextual learned representation associated with a context for the log data;
generating a first cluster from the first learned representation and a second cluster from the second learned representation during execution of the application that is executing;
generating a homogeneity score for the first cluster generated from the first learned representation and the second cluster generated from the second learned representation;
comparing, during execution of the application that is executing, the first learned representation to the second learned representation to identify unexpected events or unexpected frequencies, wherein comparing includes calculating a distance between the first and second learned representations, wherein the distance is determined based on the homogeneity score and a threshold; and
determining if the change in code is acceptable based on the comparison.

2. The method of claim 1, further comprising generating tokens from the log data and computing vectors from token data, the first and second learned representation generated from the vectors.

3. The method of claim 1, wherein the unexpected events include unexpected log events.

4. The method of claim 1, wherein the unexpected frequencies include unexpected frequencies of log events.

5. The method of claim 1, wherein the clusters of the first and second learned representations are created for real time processing.

6. A non-transitory computer readable storage medium having embodied thereon a program, the program being executable by a processor to perform a method for automatically continuously deploying code changes, the method comprising:
receiving log data from a delegate on a remote machine, the delegate collecting log data from a node within an application that is currently executing, the log data including a first log data associated with a change in code within the node and a second log data;
generating a first learned representation for the received first log data and a second learned representation for the received second log data;
generating a first cluster from the first learned representation and a second cluster from the second learned representation during execution of the application that is executing;
generating a homogeneity score for the first cluster generated from the first learned representation and the second cluster generated from the second learned representation;
comparing, during execution of the application that is executing, the first learned representation to the second learned representation to identify unexpected events or unexpected frequencies, wherein each of the first learned representation and the second learned representation includes a textual learned representation and a contextual learned representation, the contextual learned representation associated with a context for the log data, wherein comparing includes calculating a distance between the first and second learned representations wherein the distance is determined based on the homogeneity score and a threshold; and
determining if the change in code is acceptable based on the comparison.

7. The non-transitory computer readable storage medium of claim 6, further comprising generating tokens from the log data and computing vectors from token data, the first and second learned representation generated from the vectors.

8. The non-transitory computer readable storage medium of claim 6, wherein the unexpected events include unexpected log events.

9. The non-transitory computer readable storage medium of claim 6, wherein the unexpected frequencies include unexpected frequencies of log events.

10. The non-transitory computer readable storage medium of claim 6, wherein the first and second learned representations are created for real time processing.

11. The non-transitory computer readable storage medium of claim 6, wherein calculating a distance includes comparing the clusters of the first and second learned representations.

12. A system for automatically continuously deploying code changes, comprising:
a server including a memory and a processor; and
one or more modules stored in the memory and executed by the processor to
receive, by a manager application on the server, log data from a delegate on a remote machine, the delegate collecting log data from a node within an application that is currently executing, the log data including a first log data associated with a change in code within the node and a second log data,
generate a first learned representation for the received first log data and a second learned representation for the received second log data by the manager application, wherein each of the first learned representation and the second learned representation includes a textual learned representation and a contextual learned representation, the contextual learned representation associated with a context for the log data,
generating a first cluster from the first learned representation and a second cluster from the second learned representation during execution of the application that is executing;
generating a homogeneity score for the first cluster generated from the first learned representation and the second cluster generated from the second learned representation;
compare, during execution of the application that is executing, the first learned representation to the second learned representation to identify unexpected events or unexpected frequencies, wherein comparing includes calculating a distance between the first and second learned representations, wherein the distance is determined based on the homogeneity score and a threshold, and
determine if the change in code is acceptable based on the comparison.

\* \* \* \* \*